US012657692B2

(12) United States Patent (10) Patent No.: US 12,657,692 B2
Onozuka et al. (45) Date of Patent: Jun. 16, 2026

(54) VISUAL INSPECTION DEVICE, VISUAL INSPECTION METHOD, IMAGE GENERATION DEVICE, AND IMAGE GENERATION METHOD

(71) Applicant: Hitachi Astemo, Ltd., Hitachinaka (JP)

(72) Inventors: Hideaki Onozuka, Hitachinaka (JP); Shinichi Inoue, Hitachinaka (JP); Takamasa Imaizumi, Hitachinaka (JP); Hiroyuki Hayashi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 269 days.

(21) Appl. No.: 18/565,870

(22) PCT Filed: Jun. 7, 2022

(86) PCT No.: PCT/JP2022/022903
§ 371 (c)(1),
(2) Date: Nov. 30, 2023

(87) PCT Pub. No.: WO2022/260028
PCT Pub. Date: Dec. 15, 2022

(65) Prior Publication Data
US 2024/0362771 A1 Oct. 31, 2024

(30) Foreign Application Priority Data
Jun. 11, 2021 (JP) ................................. 2021-097770

(51) Int. Cl.
*G06T 7/00* (2017.01)
(52) U.S. Cl.
CPC .... *G06T 7/001* (2013.01); *G06T 2207/20081* (2013.01); *G06T 2207/20084* (2013.01);
(Continued)

(58) Field of Classification Search
CPC .................. G06T 7/001; G06T 7/0004; G06T 2207/20081; G06T 2207/20084;
(Continued)

(56) References Cited

FOREIGN PATENT DOCUMENTS

| JP | 2019-109577 A | 7/2019 |
| JP | 6731570 B2 * | 7/2020 |
| JP | 2021018064 A * | 2/2021 |

OTHER PUBLICATIONS

International Search Report dated Aug. 16, 2022 issued in International Application No. PCT/JP2022/022903, with English translation, 6 pages.

(Continued)

*Primary Examiner* — Kathleen M Broughton
(74) *Attorney, Agent, or Firm* — FOLEY & LARDNER LLP

(57) ABSTRACT

Provided is a visual inspection device including: an image pickup unit configured to pick up an image of a surface of an object to be inspected; a posture control unit configured to change a posture of the object to be inspected with respect to the image pickup unit; a storage unit having stored therein a learning result obtained by machine learning using a defective product sample image, the defective product sample image being generated by combining a defect portion image prepared in advance with a non-defective product image of the object to be inspected at a combination position obtained by referring to three-dimensional data corresponding to the object to be inspected tilted so as to form a posture angle set in advance; and an inspection unit configured to inspect the surface of the object to be inspected based on a picked-up image picked up at the posture angle by the image pickup unit and on the learning result.

7 Claims, 6 Drawing Sheets

(52) U.S. Cl.
CPC .............. *G06T 2207/20221* (2013.01); *G06T 2207/30164* (2013.01)

(58) Field of Classification Search
CPC ........... G06T 2207/20221; G06T 2207/30164; G01B 11/30; G01N 21/88
See application file for complete search history.

(56) References Cited

OTHER PUBLICATIONS

Written Opinion dated Aug. 16, 2022 issued in International Application No. PCT/JP2022/022903, with English translation, 6 pages.

* cited by examiner

FRONT IMAGE

DEFECT
COORDINATES ON IMAGE
$$\begin{bmatrix} x_0 \\ y_0 \end{bmatrix}$$

DEFECT
COORDINATES ON IMAGE
$$\begin{bmatrix} x(\phi_x) \\ y(\phi_x) \end{bmatrix}$$

VISUAL INSPECTION DEVICE, VISUAL INSPECTION METHOD, IMAGE GENERATION DEVICE, AND IMAGE GENERATION METHOD

TECHNICAL FIELD

The present invention relates to a visual inspection device, a visual inspection method, an image generation device, and an image generation method.

BACKGROUND ART

In Patent Literature 1, there is disclosed a data generation device including: a determination unit for determining, by a discriminator, whether or not a detection target part is included in an inspection object based on a plurality of images of the inspection object; an acquisition unit for acquiring a plurality of images of the inspection object under two or more different image pickup conditions; and a generation unit for generating, when it is determined by the determination unit that the detection target part is included in the inspection object based on any of the plurality of images, a plurality of pieces of new data for learning by associating information on the detection target part with each of the plurality of images.

CITATION LIST

Patent Literature

PTL 1: JP 2019-109577 A

SUMMARY OF INVENTION

Technical Problem

Patent Literature 1 provides a technology for training the discriminator so as to suppress occurrence of erroneous determination of overlooking the detection target part even under a different image pickup condition, and does not provide a technology for generating an image for learning itself for use in inspection.

Incidentally, in order to improve an inspection accuracy of the inspection object, in some cases, the inspection object is inspected by picking up images thereof at a plurality of posture angles. In those cases, construction of the image for learning is required for each posture angle, and there has been a fear of an increase in man-hours.

Solution to Problem

The present invention has an object to provide a visual inspection device, a visual inspection method, an image generation device, and an image generation method with which an inspection accuracy of an inspection object surface can be improved while an increase in man-hours is suppressed.

According to one embodiment of the present invention, there is provided a visual inspection device including: an image pickup unit configured to pick up an image of a surface of an object to be inspected; a posture control unit configured to change a posture of the object to be inspected with respect to the image pickup unit; a storage unit having stored therein a learning result obtained by machine learning using a defective product sample image, the defective product sample image being generated by combining a defect portion image prepared in advance with a non-defective product image of the object to be inspected at a combination position obtained by referring to three-dimensional data corresponding to the object to be inspected tilted so as to form a posture angle set in advance; and an inspection unit configured to inspect the surface of the object to be inspected based on a picked-up image picked up at the posture angle by the image pickup unit and on the learning result.

According to the one embodiment of the present invention, the inspection accuracy of the inspection object surface can be improved while the increase in man-hours is suppressed.

DESCRIPTION OF EMBODIMENTS

First Embodiment

Figure 1:
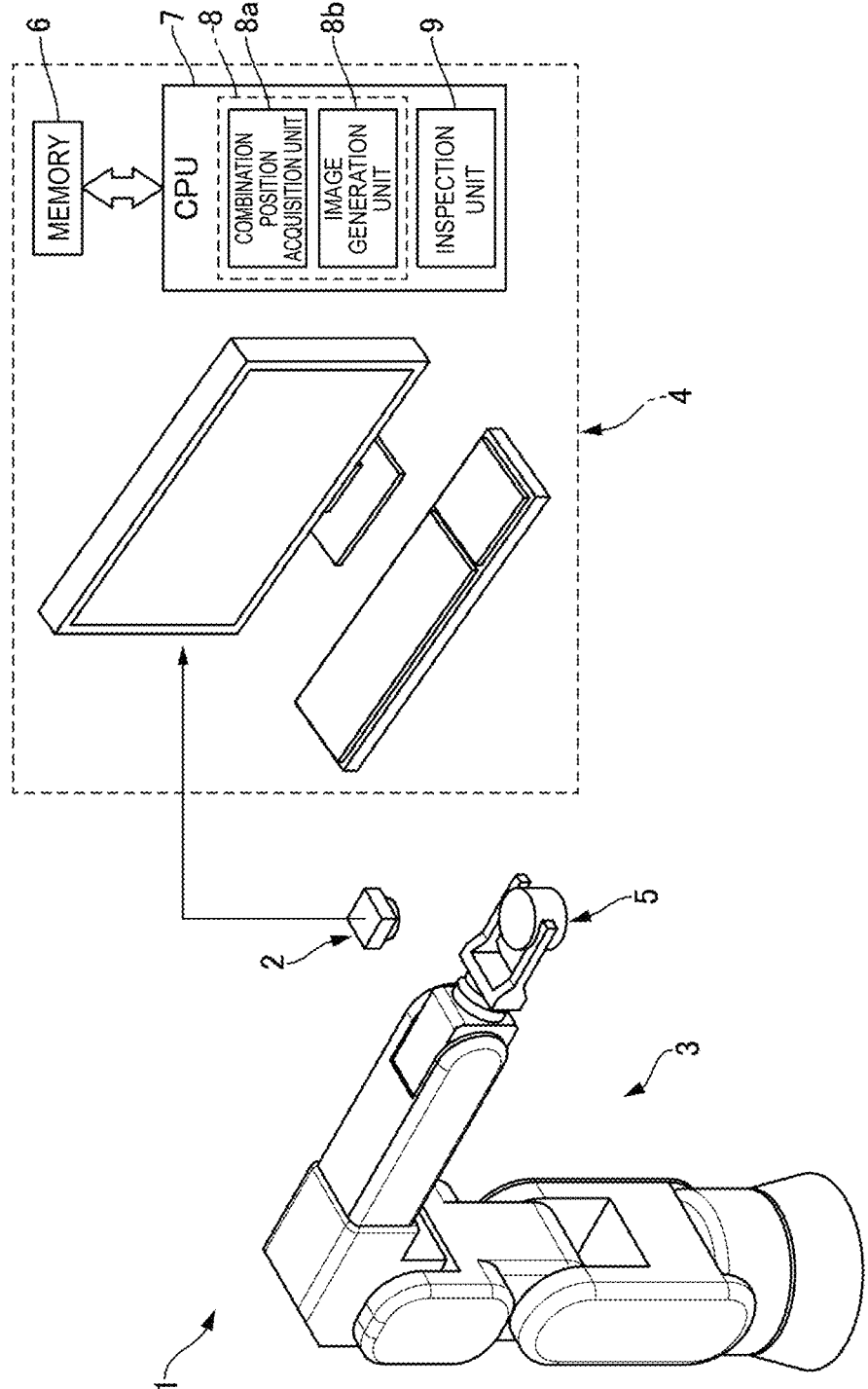
FIG. 1 is a schematic diagram of a visual inspection device 1 of a first embodiment of the present invention.

FIG. 1 is a schematic diagram of a visual inspection device 1 of a first embodiment of the present invention.

The visual inspection device 1 of the first embodiment includes a camera (image pickup unit) 2, a robot (posture control unit) 3, and a computer 4.

The camera 2 picks up an image of a surface of a piston 5 serving as an object to be inspected (image pickup step).

The robot 3 changes an angle (posture angle) of the piston 5 with respect to the camera 2.

The computer 4 is, for example, a personal computer, and includes a memory (storage unit) 6 and a CPU 7.

The CPU 7 includes an image generation device 8 and an inspection unit 9. The image generation device 8 includes a combination position acquisition unit 8a and an image generation unit 8b.

The memory 6 has stored therein learning results obtained by machine learning using a plurality of defective product sample images. The machine learning is learning using a neural network, and, in the first embodiment, learning performed by deep learning is adopted.

In this manner, in a case of the learning using the neural network, no feature engineering is required, and hence a determination accuracy of the visual inspection can be enhanced. In addition, a sufficient number of defective product samples are required, but, as described later, because pseudo defective product samples are used, the determination accuracy of the visual inspection can be improved without collecting actual defective product samples.

Further, the learning is performed by deep learning in which neural networks are combined in multiple layers, and hence, as compared to the case of using the neural network, the determination accuracy of the visual inspection can be improved.

The plurality of defective product sample images are generated by combining, by the image generation unit 8*b*, a defect portion image prepared in advance with a surface image of the piston 5, at a combination position obtained by the combination position acquisition unit 8*a* with reference to three-dimensional data corresponding to the piston 5 tilted so as to form a posture angle set in advance.

Figure 2:
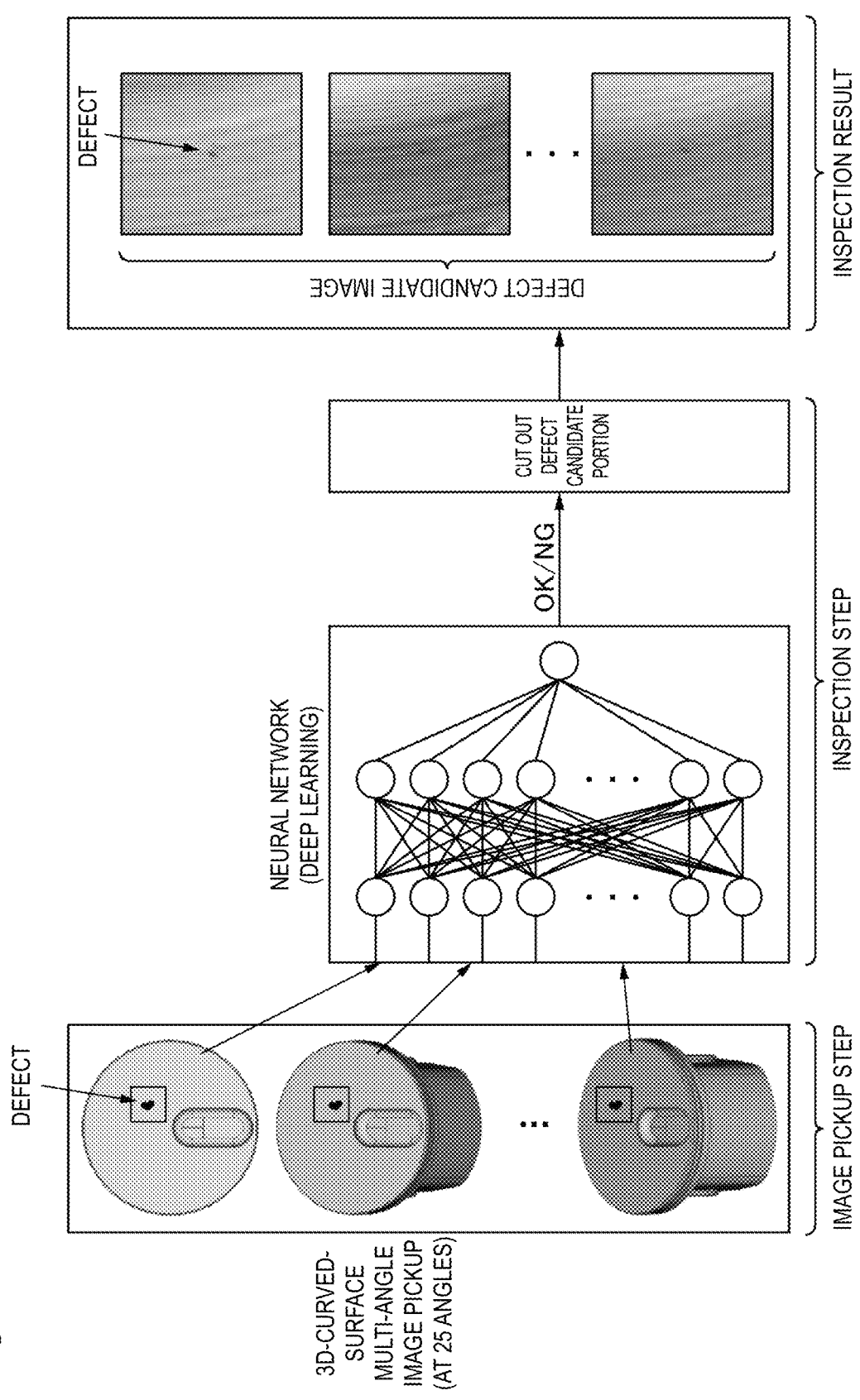
FIG. 2 is a time chart for illustrating an operation of an inspection unit in the first embodiment.

FIG. 2 is a time chart for illustrating an operation of the inspection unit in the first embodiment.

The camera 2 picks up images of the surface of the piston 5 by 3D-curved-surface multi-angle image pickup at 25 angles (posture angles) (image pickup step).

Next, the CPU 7 inspects, based on a program stored in the memory 6, whether or not the surface of the piston 5 has a scratch or a defect based on the picked-up image picked up by the camera 2 and the learning results obtained by deep learning stored in the memory 6 (inspection step), and cuts out a defect candidate portion to output a defect candidate image serving as an inspection result.

Figure 3:
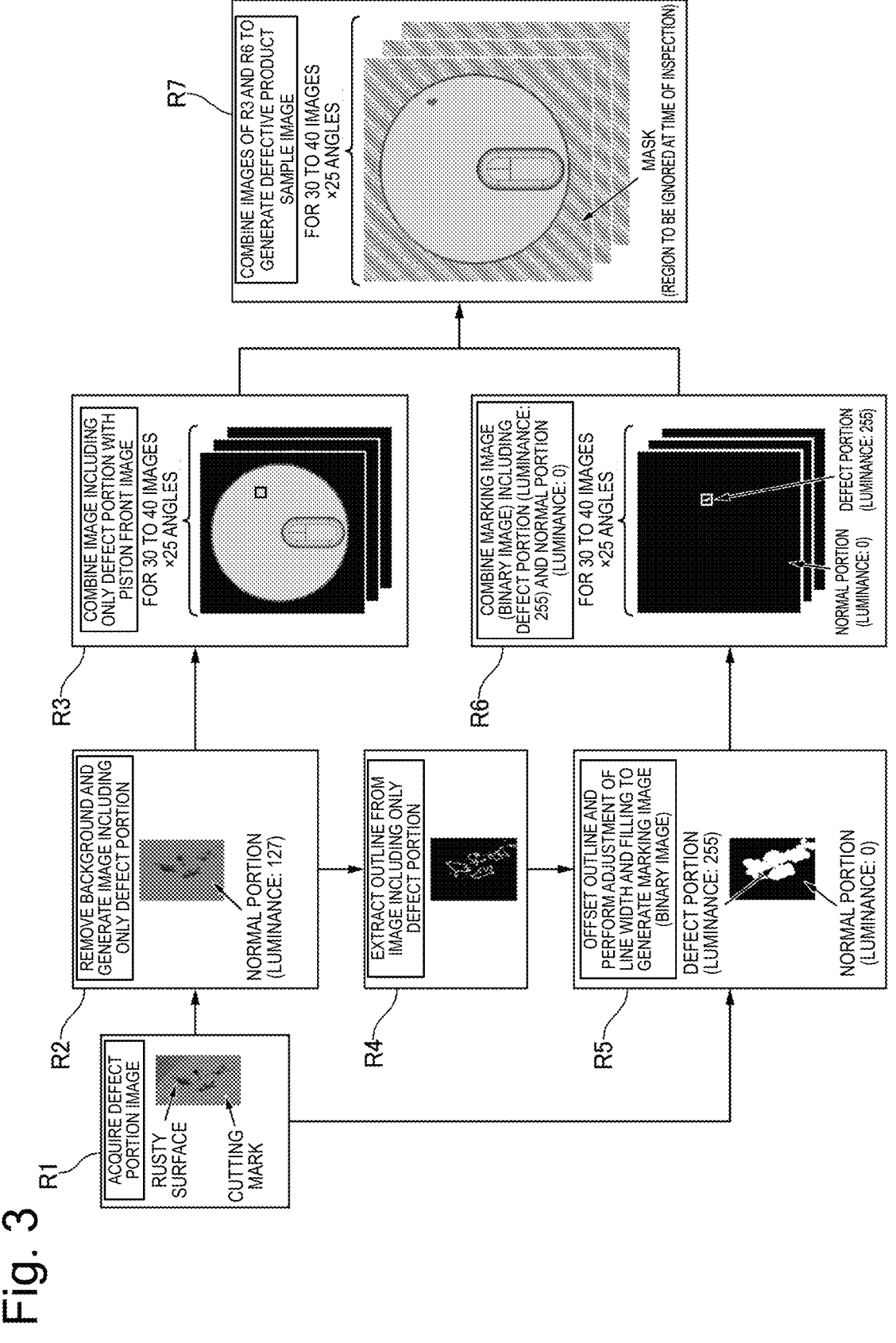
FIG. 3 is a time chart for illustrating a flow of a method of generating a defective product sample image in the first embodiment.

FIG. 3 is a time chart for illustrating a flow of a method of generating the defective product sample image in the first embodiment.

In a first block R1, a two-dimensional defect portion image to be combined is acquired.

This defect portion image may be an image obtained from the real piston 5, or may be a designed fake image.

In a second block R2, a background of the defect portion image is removed so as to generate an image including only the defect portion.

In a third block R3, a two-dimensional front image is generated by combining, at the designated two-dimensional coordinates, the image from which the background is removed and which includes only the defect portion with each of two-dimensional front images (30 to 40 images×25 angles (posture angles)) of the surface of the piston 5 subjected to image pickup by the camera 2.

In a fourth block R4, a two-dimensional front image obtained by extracting an outline from the two-dimensional front image from which the background is removed and which includes only the defect portion is generated.

In a fifth block R5, the outline is offset, and adjustment of the line width and filling are performed. Thus, a two-dimensional front image serving as a marking image (binary image) in which the luminance of the defect portion is 255 and the luminance of a normal portion is 0 is generated.

In this manner, manual marking work of the defect portion can be reduced.

In a sixth block R6, a two-dimensional front image is generated by combining, at the designated two-dimensional coordinates, the marking image (binary image) in which the luminance of the defect portion is 255 and the luminance of the normal portion is 0 with each of two-dimensional front images (30 to 40 images×25 angles (posture angles)) picked up by the camera 2.

The designated two-dimensional coordinates are corrected with reference to the three-dimensional data of the piston 5. Details are described later.

This three-dimensional data may be a three-dimensional CAD model or data obtained by reading the real piston 5 and performing data conversion.

In a block R7, a two-dimensional defective product sample image is generated by combining the two-dimensional front image generated in the third block R3 with the two-dimensional front image generated in the sixth block R6.

On the outer side of the image of the piston 5, a mask is provided as a region to be ignored at the time of inspection.

In this manner, an increase in man-hours can be suppressed.

Figure 4:
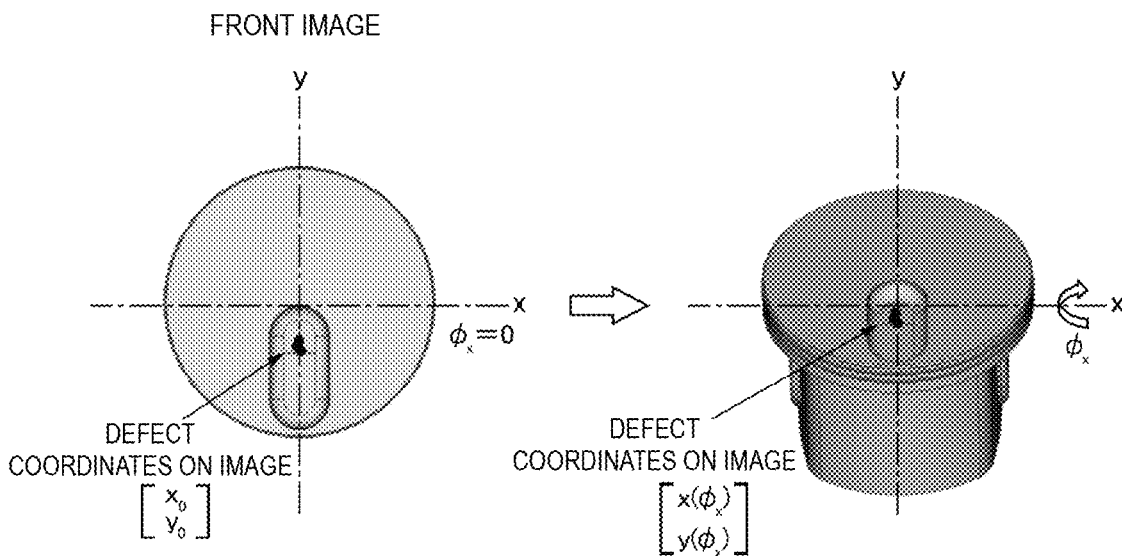
FIG. 4 is an explanatory view of calculation of coordinates of a combination position with reference to three-dimensional data in the first embodiment.

FIG. 4 is an explanatory view of calculation of coordinates of the combination position with reference to the three-dimensional data in the first embodiment.

That is, when the two-dimensional defective product sample image is generated by combining the defect portion on the two-dimensional front image of the piston 5, there is a fear in that the combination position of the two-dimensional front image of the piston 5 becomes inaccurate.

Accordingly, in the first embodiment, with reference to the three-dimensional data of the piston 5, the designated two-dimensional coordinates (x0, y0) are corrected to two-dimensional coordinates (x($\varphi_x$), y($\varphi_x$)).

That is, as illustrated in FIG. 4, the two-dimensional coordinates (x($\varphi_x$), y($\varphi_x$)) can be obtained from Equation (1) below, which corresponds to a case in which the piston 5 is rotated by $\varphi_x$ about the x-axis.

$$\begin{bmatrix} x(\phi_x) \\ y(\phi_x) \\ z(\phi_x) \end{bmatrix} = \begin{bmatrix} 1 & 0 & 0 \\ 0 & \cos \phi_x & -\sin \phi_x \\ 0 & \sin \phi_x & \cos \phi_x \end{bmatrix} \begin{bmatrix} x_0 \\ y_0 \\ z_0 \end{bmatrix} \qquad (1)$$

In FIG. 4 and Equation (1), in order to simplify the description, a case in which the piston 5 is rotated by $\varphi_x$ about the x-axis is shown as an example, but, in an actual operation, images are pickup up at various postures by combining rotation about the x-axis and rotation about the y-axis. Thus, as shown in Equation (2) below, the posture change about the y-axis is also combined in the equation.

$$\begin{bmatrix} x(\phi_x, \phi_y) \\ y(\phi_x, \phi_y) \\ z(\phi_x, \phi_y) \end{bmatrix} = \begin{bmatrix} \cos \phi_y & 0 & \sin \phi_y \\ 0 & 1 & 0 \\ -\sin \phi_y & 0 & \cos \phi_y \end{bmatrix} \begin{bmatrix} 1 & 0 & 0 \\ 0 & \cos \phi_x & -\sin \phi_x \\ 0 & \sin \phi_x & \cos \phi_x \end{bmatrix} \begin{bmatrix} x_0 \\ y_0 \\ z_0 \end{bmatrix} \qquad (2)$$

Figure 5:
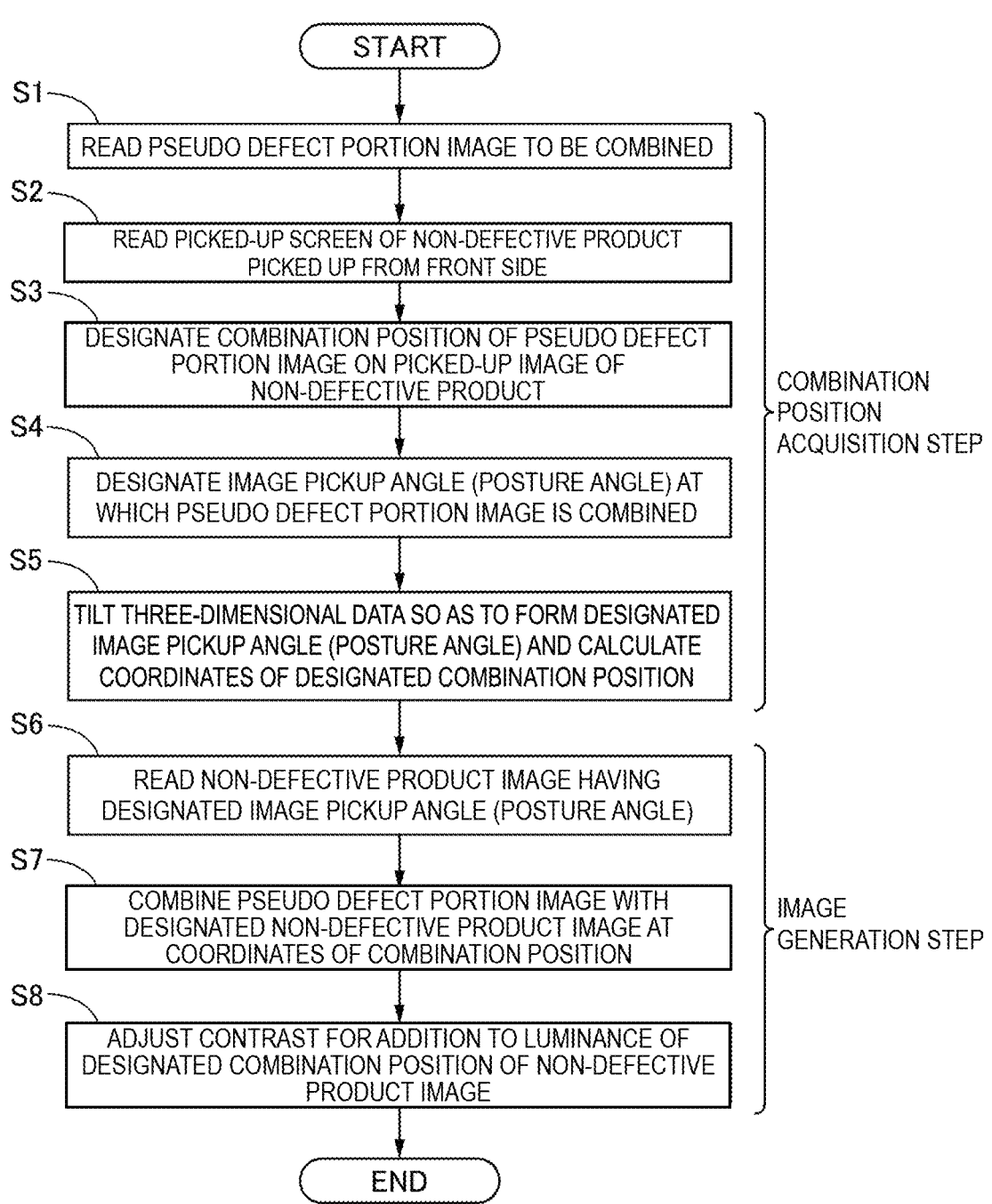
FIG. 5 is a flow chart for illustrating the method of generating the defective product sample image with reference to the three-dimensional data in the first embodiment.
Figure 6:
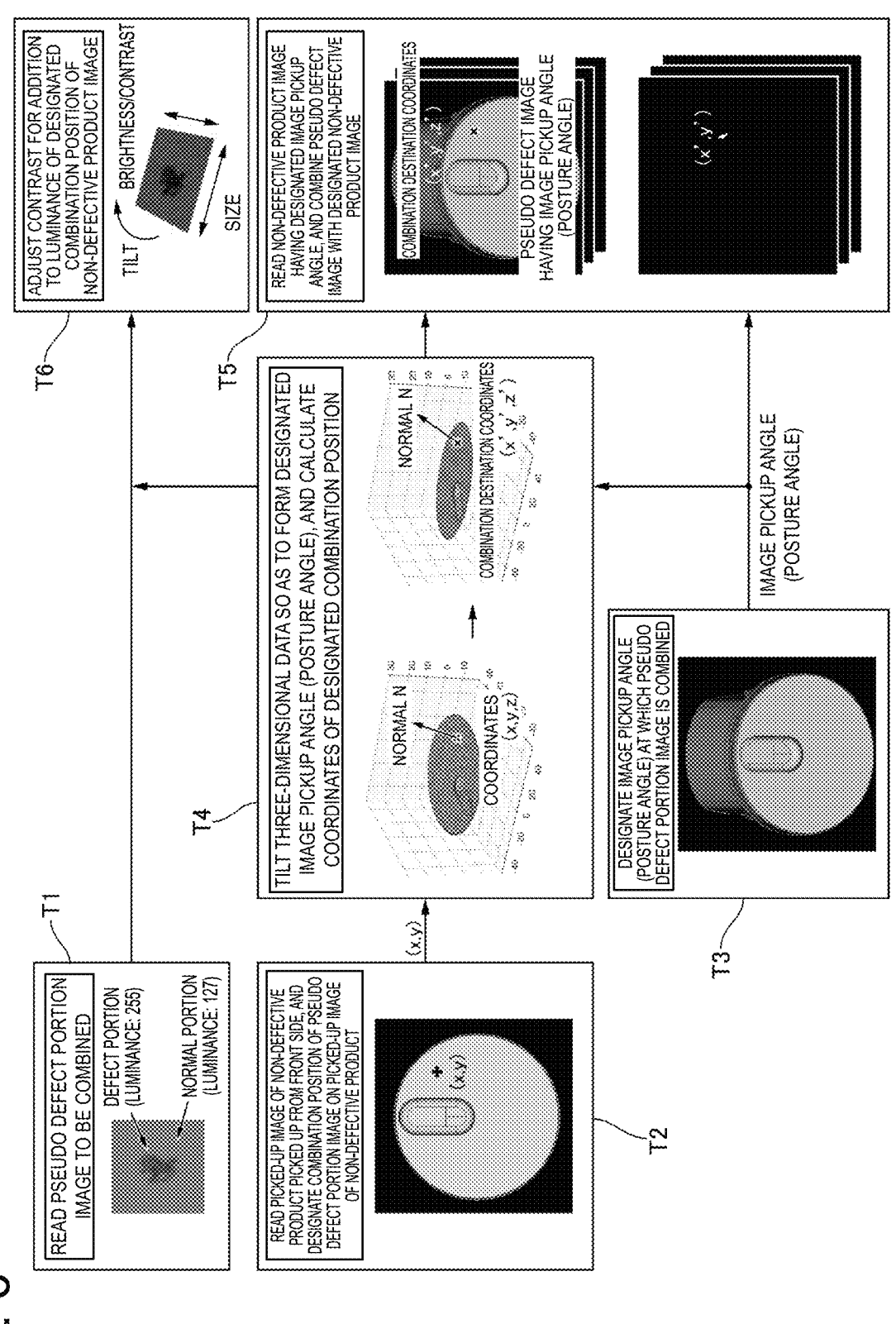
FIG. 6 is a time chart for illustrating a flow of the method of generating the defective product sample image with reference to the three-dimensional data in the first embodiment.

FIG. 5 is a flow chart for illustrating the method of generating the defective product sample image with reference to the three-dimensional data in the first embodiment, and FIG. 6 is a time chart for illustrating a flow of the method of generating the defective product sample image with reference to the three-dimensional data in the first embodiment.

In Step S1, a pseudo defect portion image to be combined is read (Block T1 of FIG. 6).

In Step S2, a picked-up image of a non-defective piston 5 picked up from the front side is read, and, in Step S3, the combination position of the pseudo defect portion image is designated on the picked-up image of the non-defective piston 5 (Block T2 of FIG. 6).

In Step S4, an image pickup angle (posture angle) at which the pseudo defect portion image is combined is designated (Block T3 of FIG. 6).

In Step S5, the three-dimensional data of the non-defective piston 5 is tilted so as to form the designated image pickup angle (posture angle), and coordinates of an element of the designated combination position are calculated (Block T4 of FIG. 6).

Three-dimensional coordinates of the combination position designated first are (x, y, z), and three-dimensional coordinates of the combination position corrected by tilting the three-dimensional data of the non-defective piston 5 so as to form the designated image pickup angle (posture angle) are (x', y', z').

The two-dimensional coordinates (x', y') of this corrected combination position correspond to the above-mentioned two-dimensional coordinates (x($\varphi_x$), y($\varphi_x$)).

Step S1 to Step S5 described above correspond to a combination position acquisition step to be executed by the combination position acquisition unit 8*a* of the image generation device 8.

In Step S6, a non-defective product image having the designated image pickup angle (posture angle) is read, and, in Step S7, the pseudo defect portion image is combined with the designated non-defective product image at the two-dimensional coordinates (x', y') of the combination position (Block T5 of FIG. 6).

In Step S8, the contrast is adjusted for conversion to the luminance of the designated combination position of the two-dimensional image of the non-defective product (Block T6 of FIG. 6).

Step S6 to Step S8 described above correspond to an image generation step to be executed by the image generation unit 8*b* of the image generation device 8.

In this manner, because a position in the height direction (z coordinate) which is not included in the two-dimensional front image of the piston 5 is referred to, the combination position for combining the defect portion on the two-dimensional front image of the piston 5 becomes accurate. Accordingly, the accuracy of the learning results obtained by machine learning is improved, and thus the inspection accuracy can be improved.

Next, actions and effects of the first embodiment are described.

(1) The visual inspection device 1 includes: the camera 2 for picking up an image of the surface of the piston 5; the robot 3 for changing the posture of the piston 5 with respect to the camera 2; the memory 6 having stored therein a learning result obtained by machine learning using the defective product sample image generated by combining the defect portion image prepared in advance with the surface image of the piston 5 at the combination position obtained with reference to the three-dimensional data corresponding to the piston 5 tilted so as to form the image pickup angle (posture angle) set in advance; and the inspection unit 9 for inspecting the surface of the piston 5 based on the picked-up image picked up at the image pickup angle (posture angle) by the camera 2 and on the learning result.

Thus, the inspection accuracy of the inspection object surface can be improved while the increase in man-hours is suppressed.

(2) The defect portion image is a binary image in which a luminance of a part that is not a defect part is zero.

Thus, the manual marking work of the defect portion can be reduced.

(3) The defect portion image is combined at the combination position with contrast thereof being adjusted based on the image pickup angle (posture angle).

Thus, the defect portion image becomes clear, and the accuracy of the defective product sample image can be improved.

(4) The combination position is obtained from the three-dimensional coordinates obtained based on the two-dimensional coordinates designated in the front image of the surface of the piston 5 and on the three-dimensional data of the piston 5.

Thus, the accuracy of the combination position can be improved, and the inspection accuracy can be further improved.

(5) The machine learning is learning using a neural network.

Thus, no feature engineering is required, and hence the determination accuracy of the visual inspection can be enhanced.

Further, in a case of using the neural network, a sufficient number of defective product samples are required, but, in the first embodiment, pseudo defective product samples are used, and hence the determination accuracy of the visual inspection can be improved without collecting actual defective product samples.

(6) The machine learning is learning using deep learning.

Thus, the learning is performed by deep learning in which neural networks are combined in multiple layers, and hence, as compared to the case of using the neural network, the determination accuracy of the visual inspection can be improved.

Other Embodiments

The embodiment of the present invention has been described above. However, the specific configuration of the present invention is not limited to the configuration described in the embodiment. A modification in design and the like without departing from the scope of the gist of the invention are also encompassed in the present invention.

The object to be inspected is not limited to a piston, and the learning result is only required to be obtained by machine learning, which is not limited to a neural network or deep learning.

Further, the posture control unit performs the posture change of the piston by the robot, but the posture control unit may perform the posture change by changing the position of the camera.

The present invention is not limited to the embodiment described above, and encompasses various modification examples. For example, the embodiment has described the present invention in detail for the ease of understanding, and the present invention is not necessarily limited to a mode that includes all of the configurations described above. A part of the configuration of one embodiment may be replaced with the configuration of another embodiment, and the configuration of one embodiment may be used in combination with the configuration of another embodiment. In each embodiment, another configuration may be added to, deleted from, or replace a part of the configuration of the embodiment.

The present application claims a priority based on Japanese Patent Application No. 2021-097770 filed on Jun. 11, 2021. All disclosed contents including Specification, Scope of Claims, Drawings, and Abstract of Japanese Patent Application No. 2021-097770 filed on Jun. 11, 2021 are incorporated herein by reference in their entirety.

REFERENCE SIGNS LIST

1 visual inspection device, 2 camera (image pickup unit), 3 robot (posture control unit), 4 computer, 5 piston (object to be inspected), 6 memory (storage unit), 7 CPU, 8 image generation unit (image generation device), 8*a* combination position acquisition unit, 8*b* image generation unit, 9 inspection unit

7

8

The invention claimed is:

1. A visual inspection device for inspecting a surface of an object to be inspected, the visual inspection device comprising:

an image pickup unit configured to pick up an image of the surface of the object to be inspected;

a posture control unit configured to change a posture of the object to be inspected with respect to the image pickup unit;

a storage unit having stored therein a learning result obtained by machine learning using a defective product sample image, the defective product sample image being generated by combining a defect portion image prepared in advance with a non-defective product image of the object to be inspected at a combination position obtained by referring to three-dimensional data corresponding to the object to be inspected tilted so as to form a posture angle set in advance; and an inspection unit configured to inspect the surface of the object to be inspected based on a picked-up image picked up at the posture angle by the image pickup unit and on the learning result.

2. The visual inspection device according to claim 1, wherein the defect portion image is a binary image in which a luminance of a part that is not a defect part is zero.

3. The visual inspection device according to claim 1, wherein the defect portion image is combined at the combination position with contrast thereof being adjusted based on the posture angle.

4. The visual inspection device according to claim 1, wherein the combination position is obtained from three-dimensional coordinates obtained based on two-dimensional coordinates designated in a front image of the surface of the object to be inspected and on the three-dimensional data.

5. The visual inspection device according to claim 1, wherein the machine learning is learning using a neural network.

6. The visual inspection device according to claim 1, wherein the machine learning is learning performed by deep learning.

7. A visual inspection method of inspecting a surface of an object to be inspected by an image pickup unit configured to pick up an image of the surface of the object to be inspected, a posture control unit configured to change a posture of the object to be inspected with respect to the image pickup unit, and a computer, the visual inspection method comprising:

an image pickup step of picking up, by the image pickup unit and the posture control unit, the image of the surface of the object to be inspected at a posture angle set in advance; and an inspection step of inspecting, by the computer, the surface of the object to be inspected based on a learning result obtained by machine learning using a defective product sample image and on a picked-up image picked up at the posture angle in the image pickup step, the defective product sample image being generated by combining a defect portion image prepared in advance with a non-defective product image of the object to be inspected at a combination position obtained by referring to three-dimensional data corresponding to the object to be inspected tilted so as to form the posture angle.

* * * * *